Dec. 8, 1964   J. H. WYMAN   3,160,277
ANTIJAMMING-CONTAINER-HANDLING SYSTEM
Filed Sept. 11, 1961   2 Sheets-Sheet 1

JAMES H. WYMAN
INVENTOR.

BY Lyon & Lyon
ATTORNEYS

Dec. 8, 1964   J. H. WYMAN   3,160,277
ANTIJAMMING-CONTAINER-HANDLING SYSTEM
Filed Sept. 11, 1961   2 Sheets-Sheet 2
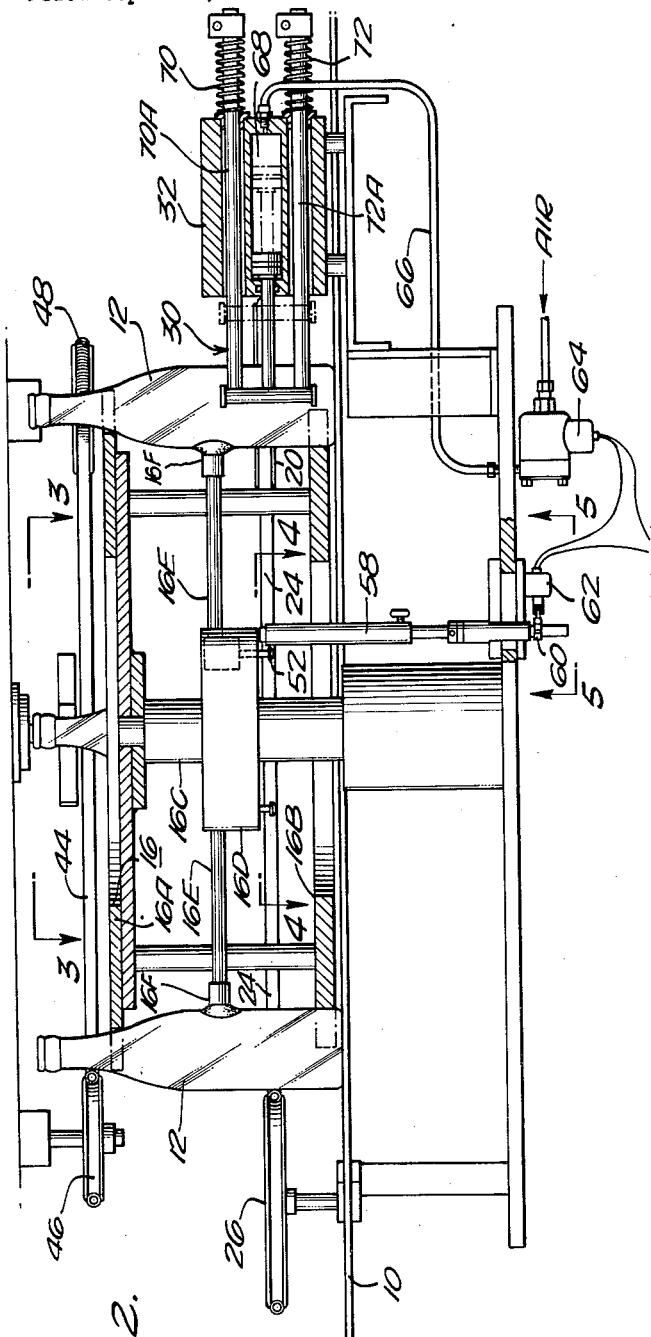
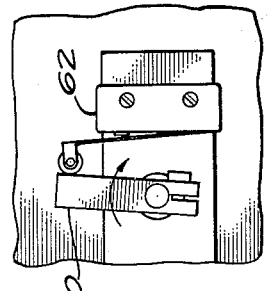
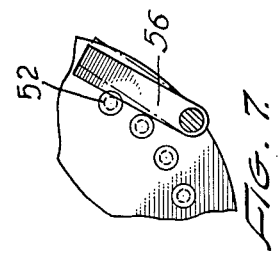
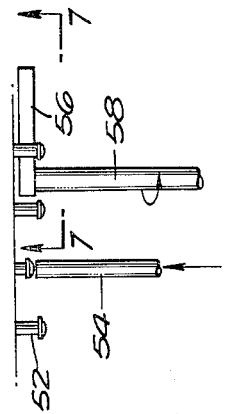
JAMES H. WYMAN
INVENTOR.
BY Lyon & Lyon
ATTORNEYS United States Patent Office 3,160,277
Patented Dec. 8, 1964

3,160,277
ANTIJAMMING-CONTAINER-HANDLING SYSTEM
James H. Wyman, San Pedro, Los Angeles, Calif., assignor, by mesne assignments, to Barry-Wehmiller Machinery Co.
Filed Sept. 11, 1961, Ser. No. 137,327
13 Claims. (Cl. 209—72)

This invention relates to apparatus for removing containers from a conveyor belt, passing them through an inspection zone, and returning those which pass inspection to the conveyor belt again and, more particularly, to improvements therein.

Although it appears quite simple, the problem of removing containers, such as bottles, from a conveyor belt for the purpose of passing them through an inspection zone and then returning these containers back to the conveyor belt can be quite difficult. One type of apparatus for performing this function may be comprised of a star wheel, having pockets in its periphery in which the containers fit. The wheel effectively is driven by the pressure of the bottles being moved on a conveyor into the star wheel. The star wheel is thus rotated past the inspection apparatus, and then, on the far side of the wheel, those of the bottles which have passed inspection are returned to the conveyor belt and the remaining bottles which have not passed inspection are passed to a rejection zone for collection and disposition. The star wheel, at the outset, must be driven by the pressure of the bottles on the conveyor. This means that when the bottles occur in sporadic bursts, which is the situation where a bottle-washing machine precedes the wheel, the star wheel may not be driven sufficiently rapidly under the influx of the "burst" to handle the sudden load thrust upon it. This results in the bottles backing up into the preceding apparatus and causing a jamup.

Still another difficulty with the free-wheeling star-wheel container-handling type of apparatus is that, when apparatus located on the downstream side of the star wheel handles these containers a little bit slower than the star wheel can handle them, there is a backup of these containers or bottles, and, if the inspection zone is not suitably guarded, then the backup can jam the inspection zone so that the bottles which have passed inspection and the bottles which have not passed inspection cannot be separated. It would appear, therefore, that all the foregoing situations can cause a jam on the production line, which requires a manual clearing up and further, of course, does cause a reduction in output of the production line. The usual solutions to the bottle-handling problem are quite complex, requiring elaborate electrical-sensing devices and complex mechanical controls.

An object of this invention is the provision of apparatus for passing containers through an inspection zone from a conveyor belt which is an improvement over prior-art apparatus, providing a significant improvement in operating efficiency with simplicity of construction.

Another object of this invention is the provision of apparatus for passing containers through an inspection zone which prevents jamup due to sporadic feeding of such apparatus.

Yet another object of this invention is the provision of a novel arrangement for passing bottles through an inspection zone from a conveyor belt which operates despite the fact that there are very few bottles on the input side of the inspection zone.

Yet another object of this invention is the provision of a novel arrangement for preventing a jamup of the reject region of a conveyor system for passing bottles through an inspection zone from a conveyor belt.

Still another object of this invention is the provision of a novel, useful, and simple system which is substantially jam-proof and which is self-regulating for passing bottles of different sizes through an inspection zone from a conveyor belt.

These and other objects of this invention are achieved in an arrangement whereby a star wheel of special type is mounted in a manner to be freely rotatable. Thus, the star wheel is not directly connected to any retarding transmission and is mounted on precision bearings so that it will spin responsive to the slightest pressure. At one side of the star wheel, which is adjacent the side at which the inspection apparatus is located, there are located adjustable roller guides which operate to press a bottle against a star wheel just before inspection, during inspection, and after inspection. Just preceding the input side of the star wheel, there may be positioned a "booster" wheel, which comprises a driven wheel for the purpose of urging any bottles into the region wherein the star wheel can remove them from the conveyor belt. It should be noted that the star wheel and roller guides are adjusted so that once a bottle is within their operative zone, it is lifted off of the conveyor belt and only returned to the conveyor belt at the reject side of the star wheel.

At the reject side of the star wheel there is provided a gate mechanism which effectively comprises a guard, located so that the opening at the discharge side of the star wheel through which a rejected bottle must pass is effectively closed or blocked. This guard is maintained in its closed position until such time as a bottle has been inspected and determined to be rejected. The guard is maintained closed thereafter until the bottle which has been rejected reaches its location, at which time it is opened, and permits that bottle to pass into the reject zone. Immediately thereafter, the gate is closed whereby, if there is any backup of bottles due to some malfunction further down the production line, no bottles will get into the reject region.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 2 is a section along the lines 2—2 in FIGURE 1, showing a view in elevation of the embodiment of the invention;

FIGURE 5 is a view along lines 5—5 in FIGURE 2, showing a detail of the actuator mechanism for the reject gate;

FIGURE 6 is a view along lines 6—6 of FIGURE 4, showing the actuator mechanism for the reject gate as well as the actuator for applying vacuum to reject a container; and FIGURE 7 is a view along lines 7—7 of FIGURE 6, showing a detail of the sensor cam for the output-gate actuator.

Figure 1:
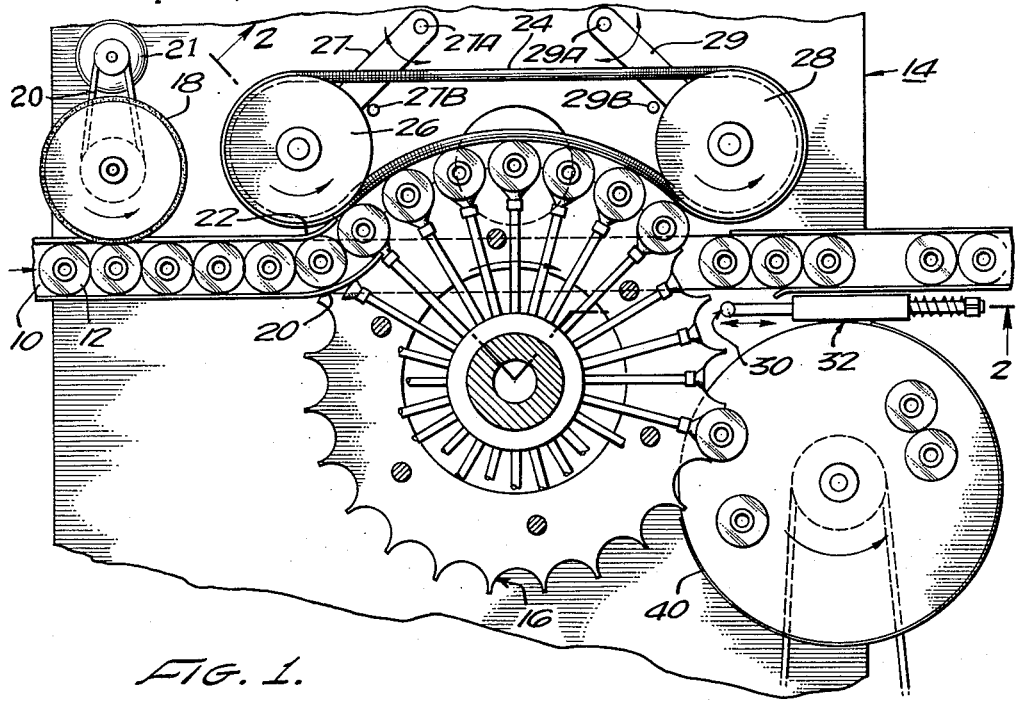
FIGURE 1 is a plan view of the entire embodiment of this invention.

The details of this invention will be described subsequently, but it is believed that by an explanation of this plan view the invention will be made clearer and the explanation thereof can proceed more simply.

Referring to the drawing, a conveyor belt 10 carries a plurality of containers 12, which, as indicated, may be bottles or containers of any other type, off the conveyor into an inspection zone, which is defined generally as 14. At the inspection zone there is located any suitable apparatus 15 for inspecting the containers for cleanliness or for any other predetermined property. For example, the apparatus could be made in accordance with the disclosure in the prior application of Wyman, Ser. No. 21,164, filed, April 11, 1960, and entitled Bottle Cleanliness Inspection Apparatus. In accordance with this invention, in order to assist a vacuum start wheel 16 of the type which is described hereunder to speed up under a sudden influx of containers, there is provided a wheel 18 which has the periphery thereof covered with rubber in order not to damage the containers. This wheel is driven through a belt 20, by a suitable variable-speed motor 21. The reason for using a variable-speed motor drive for the wheel 18 is because the sizes of the containers may differ, and therefore it is desirable to change the speed with the sizes of the containers which are driven thereby. It will be appreciated that the modern method of production does not employ a mixing of different bottle sizes simultaneously. A production run may take six-ounce bottles at one time, eight-ounce containers at another, or quart containers at a third. Therefore, the variable-speed drive is provided to handle the sizes of containers.

The wheel 18 is positioned so that it will contact with its periphery any of the containers 12 which are on the conveyor belt 10. It is rotated in a direction to urge these containers into the entry side of the vacuum start wheel 16. To assist in guiding the containers into the vacuum star wheel, a pair of curved rails 22, 23 are furnished which effectively steer the bottles into the arc, whereby the vacuum star wheel may engage them. When the conveyor is moving smoothly, the booster wheel 18 rotates and contacts at least two of the bottles on the conveyor belt, forcing them into the vacuum star wheel, and thereafter the bottles continue until they are discharged on the far side of the vacuum star wheel. In the event that the input to the region of the booster wheel is sporadic, that is, two or three bottles at a time are received, or even one bottle, it will feed these bottles, one at a time, into the vacuum star wheel, thereby maintaining the vacuum star wheel loaded and maintaining the drive thereon. The vacuum star wheel will discharge as many bottles on its exit side as are fed into its input side by virtue of the forced input by the booster wheel.

In the event there is a jamup of containers which extends from the discharge side of the vacuum star wheel all the way beyond the booster wheel, the booster wheel will not increase the jam or compound it. The reason for this is that the diameter of the booster wheel is sufficiently large to engage at least two of the largest bottles which are to be handles. Should the jam occur, then the two bottles engaged by the booster wheel will remain in place and merely rotate in place without causing any deleterious action on the bottles or conveyor.

The most important function of the booster wheel occurs in the presence of surges of bottles. This happens with a preceding piece of equipment, such as a bottle washer. The bottle washer normally dumps a number of bottles onto the conveyor belt and then picks up a number of others to be washed. Thus, the conveyor will receive a load of, say, thirty-two bottles, and then a space will occur while thirty-two other bottles are being washed. The booster wheel effectively speeds up the operation of the vacuum star wheel to process this load of bottles, since it assists the conveyor belt in moving these bottles into the operational region of the vacuum star wheel, thus preventing a backup of these bottles by virtue of the inertia of the vacuum star wheel, which can cause such bottle backup with the consequent jamming of the preceding equipment.

Roller spring guides 24 are positioned adjacent to the star wheel for the purpose of engaging each bottle as it enters the operational region of the vacuum star wheel, holding it firmly against the vacuum star wheel, and may assist in urging a bottle in the direction of discharge from the star wheel. As will be shown in more detail subsequently herein, these roller spring guides are effectively self-adjusting, or adjustable for various bottle sizes, and improve the operation of the inspection apparatus by holding the bottle firmly in contact with the vacuum star wheel as it passes the bottle through the inspection zone. It should be further noted that the roller spring guides are supported in a manner to be rotatable with the motion of the bottles. The significance is that the bottles or other containers are not abraded by the guides which are holding them in position, and there is minimum retarding friction. This is not the case where the guides holding containers in position against a vacuum star wheel are fixed so that effectively a container is rubbing against these as it is passing through the inspection zone.

The roller spring guides 24 are rotatably supported on pulleys 26, 28 which are freely rotatable. Since the roller spring guides are made of spring material, bottles whose dimensions vary somewhat from the normal size will be accepted thereby. The principal advantage of the free-wheeling star wheel is that it always remains loaded with containers and will not empty itself, insuring smooth input feeding with no possibility of gaps which might cause jamming.

At the discharge side of the vacuum star wheel, there is provided apparatus for receiving the rejected containers. This apparatus is the normal discharge apparatus. However, in accordance with this invention, there is also provided a gate 30 which blocks the entry into the reject region. This gate 30 is maintained closed until such time as the bottle which has been rejected reaches that region; at this time, a mechanism 32 is energized from apparatus on the vacuum star wheel 16 to open the gate 30 to enable a bottle to pass the gate into the reject region. Immediately thereafter, the gate 30 is closed.

Reference is now made to FIGURE 2, which is a section along the lines 2—2 in FIGURE 1 and shows a view in elevation of the embodiment of the invention. The vacuum star wheel 16 effectively consists of an upper and lower disc, respectively 16A, 16B, having its periphery with a plurality of curves or contours in order to fit around the container with a minimum spacing between containers. The hub of the star wheel 16C supports a valve plate 16D, from which extend a plurality of tubes 16E. Each tube is terminated by a suction cup 16F. The spacing of these tubes and suction cups is such that they engage a container 12, which is held against the provided contour of the discs 16A, 16B. Vacuum is applied to the tube 16E and through the suction cup 16F to a container unless upon inspection it is found that that container is defective, dirty, or has some reason for being rejected. This vacuum is maintained as the container passes through and out of the inspection zone and into the reject zone, which, as was shown in FIGURE 1, is guarded by the gate 30. This gate is opened partially when a reject container is detected and is completely pushed open by the rejected container in passing through. The vacuum is removed from the rejected container when it reaches the revolving reject table 40 by a suitable means, such as a cam (not shown). The gate 30 is closed after passage of the rejected container.

The containers which are moved toward the vacuum star wheel are caused to be firmly engaged with the periphery of the vacuum star wheel by an arrangement briefly described in FIGURE 1 as pulleys which support a closed-loop helical coil. In fact, there are two pairs of pulleys, one of which has been referred to and bears reference numerals 26, 28. These pulleys constitute a lower pair of pulleys, and the closed-loop helical coil spring 24 is rotatably supported thereby. The helical coil 24 over the lower pair of pulleys is urged against the lower portion of the containers 12, which are in engagement with the periphery of the star wheel. As may be more clearly seen in FIGURE 1, the lower pair of pulleys is supported on a pair of arms 27, 29, which are respectively pivotally supported about the pivot points 27A, 29A. The roller springs also tend to urge the arms 27, 29 yieldably toward each other and thereby effectively cause the urging of the pulleys 26, 28 toward the periphery of the star wheel. As a result, the spring 24 is urged in contact with the outside edges of any containers which are brought into the region to be inspected by the conveyor belt. A pair of stops, respectively 27B, 29B, are provided to limit the inward motion of the supporting arms 27, 29, respectively.

The advantage of the use of arms 27, 29, supported and biased in the manner described, is that the spring-guide rail, which is constituted by the spring 24, is automatically adjustable for different sizes of containers and effectively can urge containers of these various different sizes into secure engagemnt with the star wheel. This results in a much better and much more positive operation, on the part of the inspection apparatus, since each container is firmly passed through the inspection zone without any motions, which might cause false readings. Further, the vacuum star wheel can more firmly grip the rejected bottle, which, if otherwise loosely held, might not be picked up.

Referring now again to FIGURE 2, it will be seen that in addition to the lower pair of pulleys 26, 28 and the spring loop 24 there is provided an upper pair of pulleys, respectively 46, 48, and this upper pair of pulleys supports a spring loop 44. The function of the upper pair of pulleys is to further insure the secure holding of a container while it is passing through the inspection zone. It should be noted from FIGURE 2 that by means of this type of a support it is possible to actually remove the containers from the conveyor belt while passing them through the inspection zone so that these containers, if they constitute bottles or other transparent containers, can be passed over an illumination source without danger of the containers being dropped thereon. Further, the load of the containers is removed from the conveyor belt while they are passing through the inspection zone, and the containers do not drag on a dead plate, or support, which would impair the free-wheeling star wheel.

Figure 3:
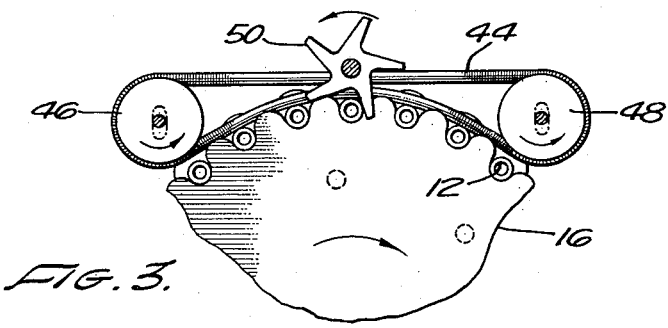
FIGURE 3 is a section along the lines 3—3 in FIGURE 2, showing the manner of engagement of the top spring guide with containers.

FIGURE 3 is a section along the lines 3—3 of FIGURE 2, which shows the manner of engagement of the top spring guide 44 with the upper portion of the containers 12, which are held firmly against the periphery of the vacuum star wheel 16. Also shown is a gating mechanism 50, which effectively is a turnstile rotated by the neck of each container through the inspection zone. This turnstile effectuates the operation of the inspection mechanism 15. It merely constitutes a means for indicating to the inspection mechanism that it should commence its operation of inspection to determine whether or not a container is good or bad.

Figure 4:
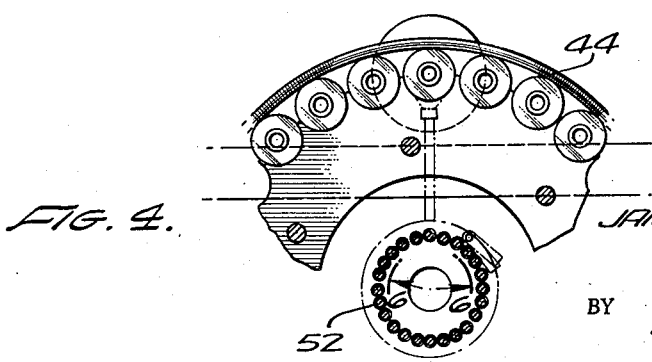
FIGURE 4 is a section along the lines 4—4 of FIGURE 2, showing the manner of engagement of the lower spring guide with containers.

FIGURE 4 is a view along the lines 4—4 of FIGURE 2. This shows the manner of engagement of the lower spring guide 24 with containers which are contacted with the edge or periphery of the star wheel. In addition, there is shown a portion of the actuation mechanism for both applying the vacuum to the tube 16E and also for initiating operation of the guard mechanism 30 when a bottle which has been inspected is rejected. Effectively, what is shown here is a plurality of valve spools 52. A different valve spool is provided for each one of the tubes 16E. When a bottle is detected as defective by the inspection mechanism, a solenoid plunger 54 is operated to cause one of the spools 52, which is associated with the tube 16E, which is in contact with the rejected bottle 12, to be pushed upward. Thereby, vacuum is enabled to be applied to the tube 16E. For the purposes of this application, it should suffice to know that the mechanism which inspects a container effectively operates a solenoid in the presence of a rejected container, which moves the correct spool valve to enable the application of a vacuum to the tube 16E in contact at that time with the container which has been rejected.

Referring now to FIGURE 6, there is seen the actuation mechanism for the reject gate. FIGURE 6 constitutes a view along the line 6—6 in FIGURE 4. A solenoid-actuated plunger 54 serves in the presence of a container to move the spool valve 52 upward, permitting vacuum to be applied to the tube which is in contact with the container, holding same until it reaches the reject region. A spool valve which has been actuated will cause operation of mechanism, to be described, whereby the guard 30 will be operated. Such mechanism includes a cam 56, which is positioned so that the narrow part of a vacuum spool 52 passing thereby will not move it, but the head of the spool valve, which has a larger diameter than the remainder thereof, does cause actuation of the first cam 56. The first cam 56 is rotatably supported on a shaft 58. Referring back to FIGURE 2, this shaft 58 extends to a position below the vacuum star wheel. At this position mounted on the shaft is another or second cam 60.

Reference is now made to FIGURE 5, which shows details of the operation of the lever arm 60. FIGURE 5 is a view along the lines 5—5 of FIGURE 2. When the shaft 58 is rotated, it causes the cam 60 to be rotated therewith. The cam 60 can then actuate a microswitch 62. The microswitch 62, as shown in FIGURE 2, connects potential from a source of potential to a solenoid 64. Air, from a source not shown, is applied through the three-way solenoid valve 64, over a tube 66, to a piston 68. In the quiescent period, or when a bottle or container has not been rejected, this air operating on the piston 68 causes the gate 30 to be closed, barring the entry of a container into the rejection zone. When the three-way solenoid 64 is operated, it closes off the air from the input side and enables the air which is applied to the tube 66 to escape. A pair of springs 70, 72 are mounted on rods, respectively 70A, 72A, in a manner so that the springs urge the rods in an outward direction to pull the gate 30 open. These springs can only exert force to pull the gate open when the air is no longer applied to the piston 68. Accordingly, as soon as air is released from the piston, the springs pull the gate back. This operation is assisted by the bottle, which has been rejected, being held firmly by reason of the vacuum being applied thereto and being carried against the partially open gate into the reject zone. Once the bottle is passed into the reject zone, a fixed cam causes the spool valve to be moved downward. Thereby, vacuum is released from the tube 16E, and the rejected bottle is deposited upon the table 40.

The first cam 56 is held in position to hold the microswitch 62 operated only until such time as the rejected bottle has just passed through the region of the gate. At this time the cam, by reason of the fact that a spring bias (not shown) is applied to the shaft 58, is unable to return to its normal position, whereby the microswitch 62 will be opened and the solenoid valve 64 will again apply the air to the tube 66 to enable it to close the guard gate 30.

There has accordingly been described and shown hereinabove a novel, useful, simple, and efficient system for insuring that containers are fed into apparatus which carries them through an inspection region, and, thereafter, if the apparatus is not rejected, back to a conveyor belt, and, if the apparatus is rejected, into a reject region. Also included is a unique apparatus for preventing the intrusion of containers into the reject zone whenever there is a backup of these containers in the vicinity of the rejection zone. The apparatus for urging the containers into the inspection zone effectively prevents backing up of these containers whenever the apparatus feeding the conveyor belt, which brings containers to the inspection zone, feeds such apparatus sporadically.

The apparatus for carrying the containers from the conveyor belt to the inspection zone and back to the conveyor belt is unique in the fact that it effectively constitutes a low-friction, yieldable, holding rail which accommodates itself to various different sizes of containers. Furthermore, these containers are held firmly in position without rotating or being abraded, whereby the actual operation of inspection and rejection is made more positive. By means of the apparatus shown and described above, the vacuum star wheel used for the purpose of carrying the containers through the inspection zone is always "filled." The benefit of this is that the flow of containers is effectively smoothed, and, for every container which enters into the inspection zone, there will be a container discharged. A further advantage of the use of the "free wheeling" vacuum star wheel combined with the "free wheeling" guard rail is that the the rate of transfer of containers through the inspection is effectively self-regulating. Expressed more clearly, the rate of passing the containers through the inspection zone by this invention is determined by the rate at which these containers are fed thereto. The apparatus in accordance with this invention effectively operates in such a manner that, regardless of what occurs on the conveyor belt, this invention plays no part, and it is not affected by such occurrences. Whatever happens on the input or output side of the bottle-handling apparatus when this invention is used is merely reflected through such bottle-handling apparatus.

I claim:

1. An apparatus for conveying containers from a conveyor belt through an inspection zone and back to said conveyor belt, the improvement comprising yieldable supporting guide means for engaging said containers prior to said inspection zone and carrying said containers in suspended positions through said inspection zone to a discharge position, said guide means being freely movable with said containers; means for urging said containers into engagement with said yieldable guide means, a rejected-container collection region adjacent said discharge region, guard means blocking said rejected-container collection region, and means responsive to an indication that a container is to be rejected for moving said blocking guard means to permit said respected container to be moved into said rejected-container collection zone.

2. Apparatus for supporting containers which are being passed through an inspection zone from a conveyor belt comprising a first and second spring in the form of a loop, first and second pairs of pulleys, said first spring being stretched over said first pair of spaced pulleys, said second spring being stretched over said second pair of spaced pulleys, and means for rotatably supporting said first and second pairs of pulleys to bring said first and second springs in yielding contact with a portion of said containers as they are being passed through said inspection zone, said pulley-supporting means being adjustable for different sizes of containers, said pulley-supporting means including means for yieldably urging said pulleys and therewith said loops against said containers.

3. Apparatus for passing containers from a conveyor belt through an inspection region off the conveyor belt and back to the same conveyor belt comprising a rotary-supported star wheel positioned adjacent said conveyor belt and said inspection zone, said star wheel having the periphery shaped for engaging a container, means for urging a container into engagement with the periphery of said star wheel for removing it from said conveyor, carrying it through said inspection zone, and depositing said container on said conveyor belt at a discharge side of said inspection zone, said means including a pair of spaced rotatable pulleys, a closed loop made of yieldable material supported by said pulleys, means for supporting said pulleys adjacent the periphery of said star wheel for engaging said containers with said loop of elastic material prior to said inspection zone within said inspection zone and on the discharge side of said star wheel, said means for supporting said pulleys including yieldable biasing means for urging said pulleys toward the periphery of said star wheel.

4. In apparatus for moving containers through an inspection zone and sorting out rejected containers: a conveyor moving relative to the inspection zone to bring containers to the zone and to receive the containers from the zone, a freely movable member adjacent said conveyor having container receiving pockets to receive and remove containers from said conveyor at a first point for inspection and return them to said conveyor at a second point after inspection, said member responding to the movement of containers brought to the inspection zone by said conveyor and directing the containers in a path different from the conveyor between the receiving and returning points, yieldable container guide means movably mounted adjacent said movable member, said guide means cooperating with said container receiving pockets to retain the containers in the pockets through the inspection zone and said guide means being moved by containers engaged in the pockets of said movable member, a container reject region disposed adjacent said conveyor where containers are returned thereto at said second point, guard means blocking said region, and means responsive to an indication that a container is to be rejected for moving said blocking guard to permit the passage of the rejected container to said region.

5. In container handling apparatus for use with container cleanliness inspection means: the combination of a conveyor having a container supporting surface movable in a straight line, a movable member operatively mounted adjacent said conveyor and having a plurality of container engaging surfaces movable in a path laterally directed relative to said conveyor path to intersect the conveyor path, the containers on said conveyor engaging the surfaces of said movable member and causing movement of said movable member, and container guide means operably mounted adjacent said movable member in position to be abutted by containers engaged on the surfaces of said movable member and cooperate with said movable member to move the containers relative to said conveyor for inspection, said movable member and guide means being freely movable together in response to the presence of containers on said conveyor and continuing to support containers until returned to said conveyor.

6. In container handling apparatus for bringing containers to a cleanliness inspection zone and for taking them away, a freely movable rotary member having pockets in its periphery movable in a curved path and presented to successively receive containers at one point of the curved path and to release containers at a second point spaced chordwise from said one point, an endless yieldable guide disposed adjacent said member, spaced means operably supporting said guide to form an endless loop with one initially straight section of such loop extending between said first and second points, said guide and supporting means being freely movable in response to movement of said member and cooperating with said member in the presence of containers to yield to the curved path of said member and hold the containers in said pockets from said one point to said second point, and conveyor means for bringing containers to said one point and for again receiving the containers at said second point, said conveyor means being generally directed chordwise between said points.

7. The apparatus set forth in claim 6 wherein reject container-collection region adjacent said second point to receive reject containers, guard means operably mounted adjacent said region to block container movement thereto from said second point, and means responsive to an indication that a container is to be rejected for operating said guard means to open said region to the container.

8. Container handling apparatus for moving containers from a supply through an inspection zone in suspended condition and to a discharge, said apparatus comprising container conveying means having a supply portion and a discharge portion, free rotating pulley means at one side of said conveyor means between said supply and discharge portions, yieldably adjustable belt means trained over said pulley means and having a container engaging portion movable normally in a rectilinear path between said conveyor portions, means between said pulley means defining the container inspection zone, a freely rotatable wheel operably mounted adjacent said conveyor means and formed with a periphery having container receiving indentations, said wheel and belt means cooperating to engage containers at said conveyor supply portion and suspend the container therebetween, said wheel causing the containers to travel in a curvilinear path and said belt means to yield from its rectilinear path and grip containers in said peripheral indentations.

9. The apparatus set forth in claim 8 wherein said rotatable wheel has its axis on the opposite side of said conveying means from said pulley means, and the container receiving indentations in the periphery of said wheel cross over said conveying means adjacent the supply portion and cross back again adjacent the discharge portion.

10. The apparatus set forth in claim 8 where said conveying means continues horizontally through the apparatus from said supply to said discharge portions, and said wheel and belt means suspend the containers without substantial change in elevation relative to the conveying means.

11. The apparatus set forth in claim 8 wherein rejected container receiving means in disposed adjacent said conveyor discharge portion, and means is carried by said wheel in position to grip containers moved toward said discharge portion of said conveyor means and direct the containers toward said rejected container receiving means.

12. Container handling apparatus for moving containers from a supply through a work zone in suspended condition and to a discharge, said apparatus comprising a free rotating shaft, a guide wheel fixed on said shaft and formed with indentations in its periphery suitable for receiving containers, free rotating pulley means adjacent said guide wheel, adjustable container engaging belt means trained over said pulley means and having an operative pass directed normally in a line which chordally intercepts the periphery of said guide wheel, and conveyor means to support containers from the bottoms and arranged to extend from a source of containers to the apparatus in a chordally directed relation to said guide wheel, said adjustable means forcing containers supported on said conveyor means into suspended positions in said guide wheel indentations, said adjustable means being driven with said guide wheel by the pressure of containers moved by said conveyor, and said adjustable means conforming to the containers and adjusting to follow a path corresponding to the periphery of said guide wheel but spaced therefrom by the presence of containers in said indentations, said guide wheel and adjustable means cooperating to suspend the containers at one side of said conveyor means for movement through the work zone and return the containers for discharge from the apparatus.

13. In container handling apparatus; a conveyor for supporting and moving the containers into a supply zone and for subsequently moving the containers out of a discharge zone spaced beyond the supply zone; container handling means between said supply and discharge zones to engage the successive containers in said supply zone and move the containers to one side of said conveyor and suspend the containers until returned to said discharge zone, said handling means including a freely rotatable wheel having container receiving indentations in its periphery and positioned to have its periphery rotate over said conveyor through said supply zone and discharge zone, pulley means spaced from said wheel, a yieldable belt trained over said pulley means in position to engage successive containers in said supply zone and press the containers into the indentations of said wheel to suspend the containers therein, said wheel and belt being moved by the pressure of containers brought to said supply zone by said conveyor and cooperating to move the suspended containers to one side of said conveyor through a path which returns the containers to said discharge zone, said belt releasing containers in said discharge zone upon said conveyor; gripping means carried by said wheel to selectively engage containers moving toward said discharge zone and maintain the containers in said indentations after release by said belt; container receiving means adjacent said discharge zone to receive containers from said gripping means; and control means operably connected to said gripping means to actuate the same and including a gate between said discharge zone and said receiving means, said gate being normally closed to prevent containers passing to said receiving means and said control means being coupled to said gate to open the gate upon a container arriving thereat in the grip of said gripping means.

References Cited in the file of this patent

UNITED STATES PATENTS

| | | |
|---|---|---|
| 2,324,783 | Kronquest | July 20, 1943 |
| 2,676,442 | Gaubert | Apr. 27, 1954 |
| 2,713,960 | Siegal | July 26, 1955 |
| 2,800,226 | Drennan | July 23, 1957 |
| 2,892,462 | Ine | June 30, 1959 |

UNITED STATES PATENT OFFICE
Certificate

Patent No. 3,160,277                          Patented December 8, 1964

James H. Wyman

Application having been made jointly by James H. Wyman, the inventor named in the patent above identified; Barry-Wehmiller Machinery Co., the assignee; Robert G. Husome and Jerome M. Rotramel of the county of Los Angeles, California, for the issuance of a certificate under the provisions of Title 35, Section 256 of the United States Code, adding the names of the said Robert G. Husome and Jerome M. Rotramel to the patent as joint inventors, and a showing and proof of facts satisfying the requirements of the said section having been submitted, it is this 7th day of June 1966, certified that the names of the said Robert G. Husome and Jerome M. Rotramel are hereby added to the said patent as joint inventors with the said James H. Wyman.

[SEAL]

EDWIN L. REYNOLDS,
*First Assistant Commissioner of Patents.*